United States Patent
Daly

(10) Patent No.: US 10,275,213 B2
(45) Date of Patent: *Apr. 30, 2019

(54) MANAGING INDICATIONS OF PHYSICAL MOVEMENT OF A PLAYBACK DEVICE DURING AUDIO PLAYBACK

(71) Applicant: Sonos, Inc., Santa Barbara, CA (US)

(72) Inventor: Seamus Daly, Marblehead, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,602

(22) Filed: Jun. 22, 2018

(65) Prior Publication Data
US 2018/0300102 A1 Oct. 18, 2018

Related U.S. Application Data

(63) Continuation of application No. 15/243,458, filed on Aug. 22, 2016, now Pat. No. 10,007,481.

(60) Provisional application No. 62/212,443, filed on Aug. 31, 2015.

(51) Int. Cl.
| | |
|---|---|
| H04R 29/00 | (2006.01) |
| H04R 3/00 | (2006.01) |
| G06F 3/16 | (2006.01) |
| G01P 13/00 | (2006.01) |

(52) U.S. Cl.
CPC ............ *G06F 3/165* (2013.01); *G01P 13/00* (2013.01); *H04R 29/007* (2013.01); *H04R 2227/001* (2013.01); *H04R 2227/003* (2013.01); *H04R 2227/005* (2013.01)

(58) Field of Classification Search
CPC . H04R 3/00; H04R 3/04; H04R 29/00; H04R 29/007; H04R 2227/001; H04R 2227/003; H04R 2227/005; G06F 3/01; G06F 3/011; G06F 3/165; G01P 13/00; H04S 7/30; H04S 7/301; H04S 7/302
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Thang V Tran
(74) *Attorney, Agent, or Firm* — Fortem IP LLP; Mary Fox

(57) ABSTRACT

Method and apparatus for physical detecting movement of a playback device which plays audio sound via a speaker enclosed in the playback device. While the speaker plays the audio sound, a determination is made whether the playback device is physically moving. In response to the playback device physically moving, the audio sound played by the speaker is modified, for example, by adjusting the volume or equalization of the audio sound, so as to reduce the physical movement of the playback device.

20 Claims, 7 Drawing Sheets

(56) References Cited

U.S. PATENT DOCUMENTS

| | | |
|---|---|---|
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 10,007,481 B2 * | 6/2018 | Daly ............... G06F 3/165 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0133813 A1 | 6/2007 | Morishima |
| 2007/0142944 A1 | 6/2007 | Goldberg et al. |
| 2007/0217619 A1 | 9/2007 | Hall et al. |
| 2008/0240474 A1 | 10/2008 | Sakamoto et al. |
| 2009/0006028 A1 * | 1/2009 | Sugawara ............ G01H 1/06 702/141 |
| 2013/0279706 A1 * | 10/2013 | Marti ............... G06F 3/165 381/57 |
| 2015/0309535 A1 * | 10/2015 | Connor ............ G06F 1/163 361/679.03 |
| 2016/0323672 A1 * | 11/2016 | Bhogal ............... H04R 5/04 |
| 2017/0055098 A1 | 2/2017 | Lim et al. |
| 2017/0142536 A1 | 5/2017 | Hattori et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 22, 2017, issued in connection with U.S. Appl. No. 15/243,458, filed Aug. 22, 2016, 10 pages.
Notice of Allowance dated Feb. 28, 2018, issued in connection with U.S. Appl. No. 15/243,458, filed Aug. 22, 2016, 5 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

MANAGING INDICATIONS OF PHYSICAL MOVEMENT OF A PLAYBACK DEVICE DURING AUDIO PLAYBACK

CROSS-REFERENCE TO RELATED APPLICATION(S)

The present application is a continuation of U.S. patent application Ser. No. 15/243,458, filed Aug. 22, 2016, which claims the benefit of priority under 35 USC § 119(e) to U.S. Provisional Application No. 62/212,443, filed on Aug. 31, 2015, each of which is incorporated by reference herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
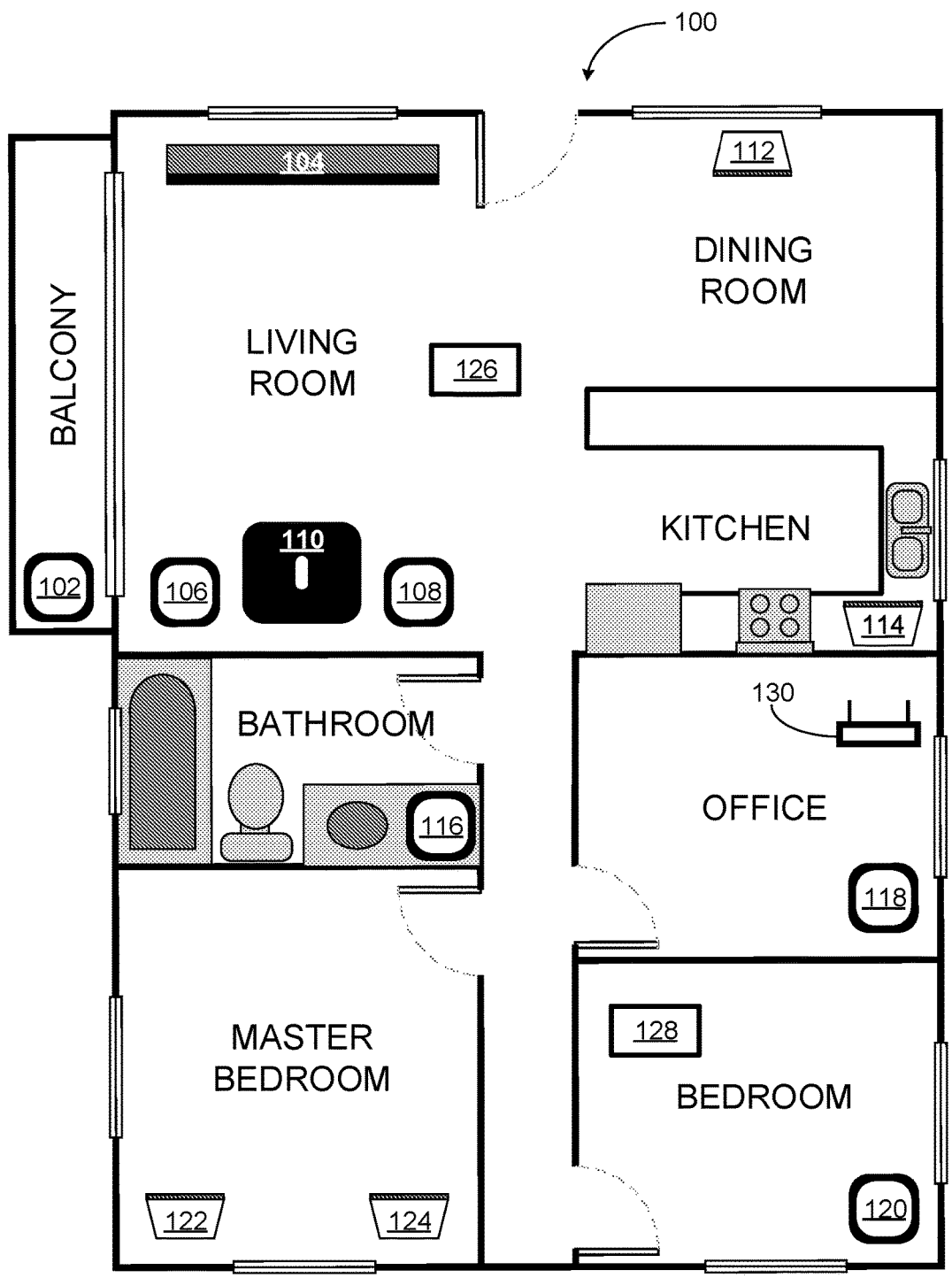
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A playback device configured to play audio sound has a speaker. The speaker includes a voice coil, a magnet, and a diaphragm. The diaphragm moves air to cause the speaker to play audio sounds. However, the movement of the speaker's diaphragm against the air may also create a force that causes the entire playback device to move as well during playback. This movement is commonly referred to as "walking" of the playback device. Such "walking" may decrease the quality of performance of the playback device, for example, by creating mechanically induced noise between the playback device and the surface on which it would normally be resting. Further, if left unattended, a walking playback device may move across a surface supporting the playback device, for example, causing the playback device to fall off the surface, thereby damaging the playback device.

Several reasons exist for a playback device being more prone to moving when playing audio sound. For example, the playback device is made up of several discrete components, such as voice coils, magnets, circuit boards, and diaphragms. Based on the placement of the components within the playback device, the playback device may be more or less prone to physically moving when the speaker is playing audio sounds. Further, due to the orientation of the playback device, e.g., horizontal or vertical, the playback device may also be more or less prone to physically moving when the speaker is playing audio sounds. Alternatively, the playback device may move because the speaker is generating high audio sound volumes. The high audio sound volumes may result in substantial speaker diaphragm excursions which in turn may cause the playback device to move. Another reason for the playback device to move could be that the user has placed the playback device on a non-horizontal surface. The playback device would not normally move on such a surface when not playing audio sound, but could be more prone to such movement when playing audio sound.

Still additionally or alternatively, the playback device may move because of the effectiveness of the "feet" of the playback device. The feet of a playback device support the weight of the playback device on a surface such as a table and prevent marring of the surface. The feet can also keep the playback device stationary when playing audio sound. However, sometimes during playback of audio sounds, the feet of the playback device may not generate a high enough coefficient of friction with respect to the surface on which the playback device is placed. This coefficient of friction cannot resist the force produced by the diaphragm acting against the air, resulting in playback device walking. In fact, in some designs, the playback device may not have any feet at all. In this situation, the playback device is resting directly on its housing, thereby increasing the chances that the playback device may move when playing audio sound.

Accordingly, some embodiments described herein relate to detecting this physical movement of the playback device when playing audio sound via a speaker enclosed in the playback device and adjusting the audio sound played by the playback device so as to reduce the physical movement of the playback device.

In the disclosed examples, a sensor may provide an indication of the physical movement of the playback device. The sensor can be one of several types such as an accelerometer, a gyroscope, or a magnetometer, among other potential examples. The output of the sensor is compared to known sensor profiles indicative of physical movement of the playback device due to audio sounds being played by the playback device. The sensor profiles are based on an output produced by a type of sensor and have a pattern indicative of movement of the playback device. In some cases, these sensor profiles are generated through a data collection process conducted during a calibration or testing of the playback device.

In embodiments, based on the determination that the playback device is moving, the playback device may take an action to reduce its movement. In some cases, this action is to adjust the audio sound played by the playback device. For example, the playback device may reduce the volume of the audio sound being played to reduce the movement. Alternatively, or additionally, the playback device may adjust the equalization of the sound. Low frequency sounds in the range of 20 to 80 Hz (sometimes referred to as bass) can cause large movement of the speaker components and therefore movement of the playback device. A change in the frequency being output by the speaker can reduce the movement of the playback device. Other actions are also possible for reducing the movement of the playback device.

As a real world example relevant to some embodiments described herein, consider a playback device set on a glass table. The playback device may be made of a material with a low coefficient of friction with respect to the glass table such as a plastic or metal. Further, the playback device may not have any "feet" supporting a housing of the playback device such as a rubber material which would otherwise generate a higher coefficient of friction with respect to the glass table. The playback device may be playing a song with a heavy bass. The bass may cause substantial excursions of the speaker's diaphragm and this force may result in the playback device starting to rock, tip, slide, and/or rotate on the table. Left unattended, the playback device may fall off the glass table, for instance. However, by detecting the physical movement of the playback device as the audio sound is being played, the audio sound may be adjusted so that the playback device no longer moves as much. For example, the volume could be reduced so that the speaker's diaphragm excursions are less or the audio could be equalized so that the audio sound has less bass. Therefore, the movement of the physical device can be reduced and avoid damage to the playback device, such as falling off the glass table.

Moving on from the above illustration, an example embodiment of a device for detecting and controlling physical movement during audio playback includes a speaker configured to play audio sound, the speaker being enclosed in the device; a processor; a non-transitory computer readable medium, and program instructions stored on the non-transitory computer readable medium that, when executed by the processor, cause the device to perform functions comprising: playing, by the device, the audio sound via the speaker; while the speaker is playing the audio sound, determining, by the device, that the device is physically moving; and adjusting, by the device, the audio sound played by the speaker in response determining that the device is physically moving.

In some embodiments, the program instructions for adjusting by the device the audio sound played by the speaker comprises adjusting one or more of a volume or equalization of the audio sound. In some embodiments, the program instructions for adjusting by the device the audio sound played by the speaker comprises decreasing a volume of the audio sound for the device and correspondingly increasing a volume of an audio sound of a remote device. In some embodiments, the program instructions for determining that the device is physically moving comprises comparing a sensor output value of a sensor to a sensor profile indicative of movement of the device. In some embodiments, the device further comprises a memory to store the sensor profile. In some embodiments, the sensor is selected from the group consisting of an accelerometer, a gyroscope, and a magnetometer. In some embodiments, the physical movement of the device comprises translational movement, rotational movement, a yaw, a pitch, a roll, or rocking movement. In some embodiments, the program instructions, when executed by the processor, cause the device to calibrate the sensor for detecting movement of the device prior to the device playing the audio sound.

An example embodiment of a device may include a tangible non-transitory computer readable storage medium including a set of instructions that when executed by a processor cause the device to: play, by the device, audio sound via a speaker enclosed in the device; determine, by the device, while the speaker is playing the audio sound that the device is physically moving; and adjust, by the device, the audio sound played by the speaker in response to determining that the device is physically moving.

In some embodiments, the instructions for determining whether the device is moving comprises comparing a sensor output value from a sensor to a sensor profile indicative of movement of the device. In some embodiments, the tangible non-transitory computer readable storage medium further comprises instructions for filtering an input into the sensor. In some embodiments, the tangible non-transitory computer readable storage medium further comprises instructions for calibrating the sensor prior to the device playing the audio sound. In some embodiments, the instructions for adjusting the audio sound played by the speaker comprises adjusting one or more of a volume or equalization of the audio sound to reduce the movement of the device. In some embodiments, the instructions for adjusting the audio sound played by the speaker comprises decreasing a volume of the audio sound for the device and correspondingly increasing a volume of an audio sound of a remote device.

An example embodiment of a method for detecting and controlling physical movement during audio playback includes playing, by a device, audio sound via a speaker enclosed in the device; while the speaker is playing the audio sound, determining, by the device, that the device is physically moving; and adjusting, by the device, the audio sound played by the speaker in response to determining that the device is physically moving.

In some embodiments, determining that the device is moving comprises comparing a sensor output value of a sensor to a sensor profile indicative of movement of the device. In some embodiments, a sensor is calibrated for detecting movement of the device prior to the device playing the audio sound. In some embodiments, adjusting the audio sound played by the speaker comprises adjusting one or more of a volume or equalization of the audio sound. In some embodiments, adjusting the audio sound played by the speaker comprises decreasing a volume of the audio sound for the device and correspondingly increasing a volume of an audio sound played by a remote device. In some embodiments, the physical movement of the device is due to excursions of the speaker's diaphragm.

While some examples described herein may refer to functions performed by given actors such as "users" and/or other entities, it should be understood that this is for purposes of explanation only. The claims should not be interpreted to require action by any such example actor unless explicitly required by the language of the claims themselves.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control device 126, 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
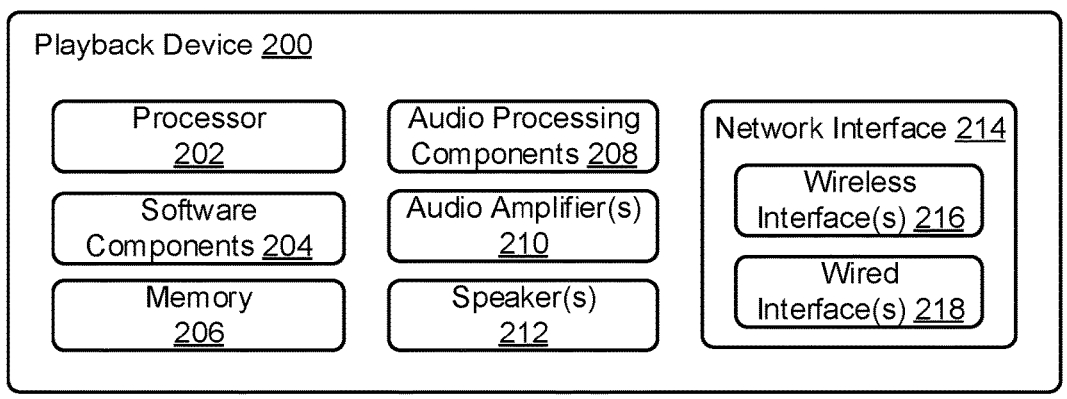
FIG. 2 shows a functional block diagram of an example playback device.

FIG. 2 shows a functional internal block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
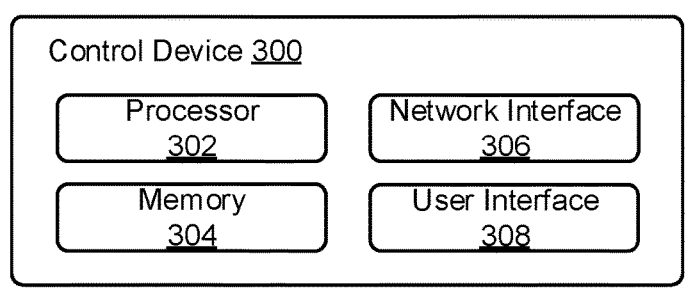
FIG. 3 shows a functional block diagram of an example control device.

FIG. 3 shows a functional block diagram of an example control device 300 that may be configured to be the control device 126 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
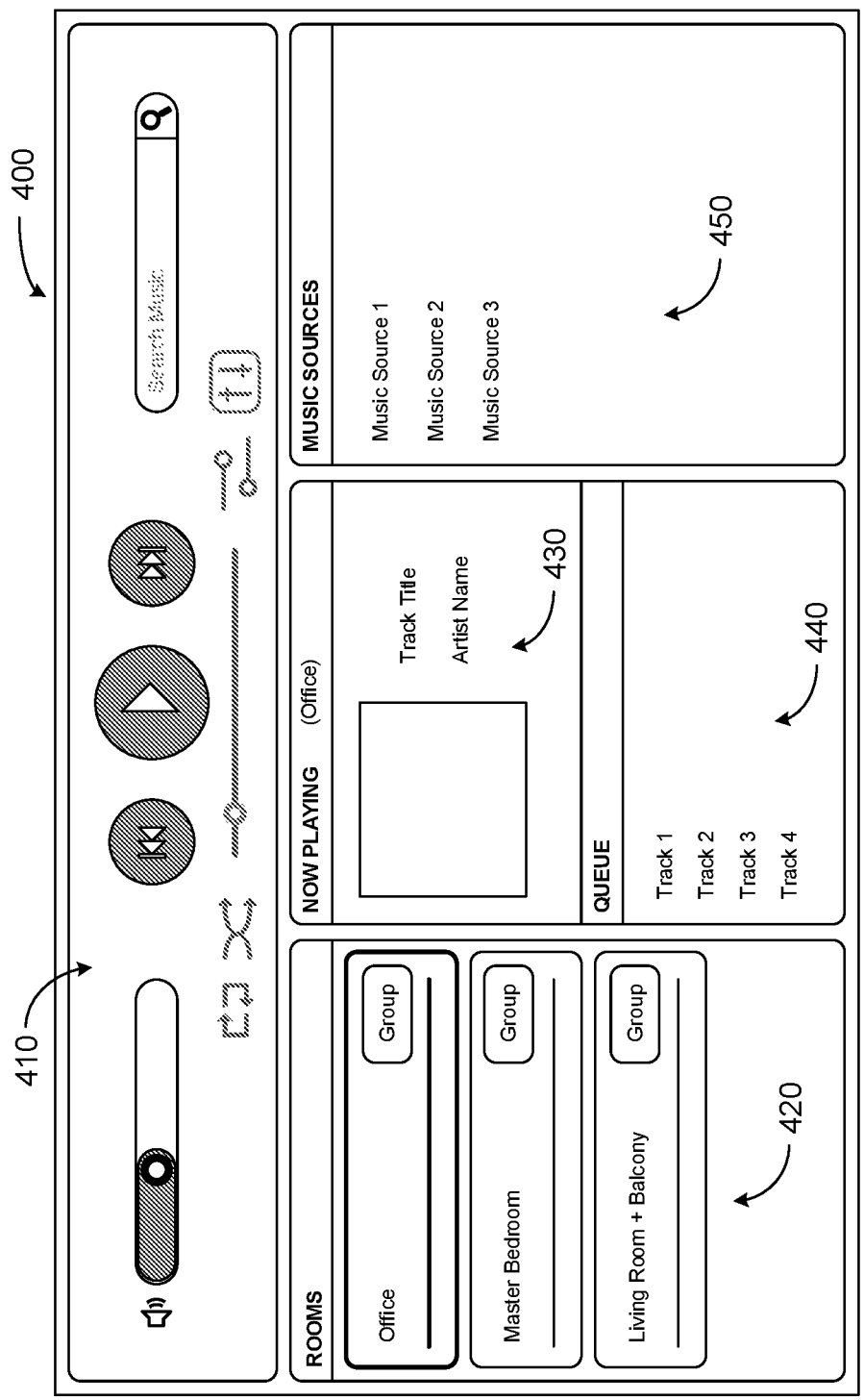
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
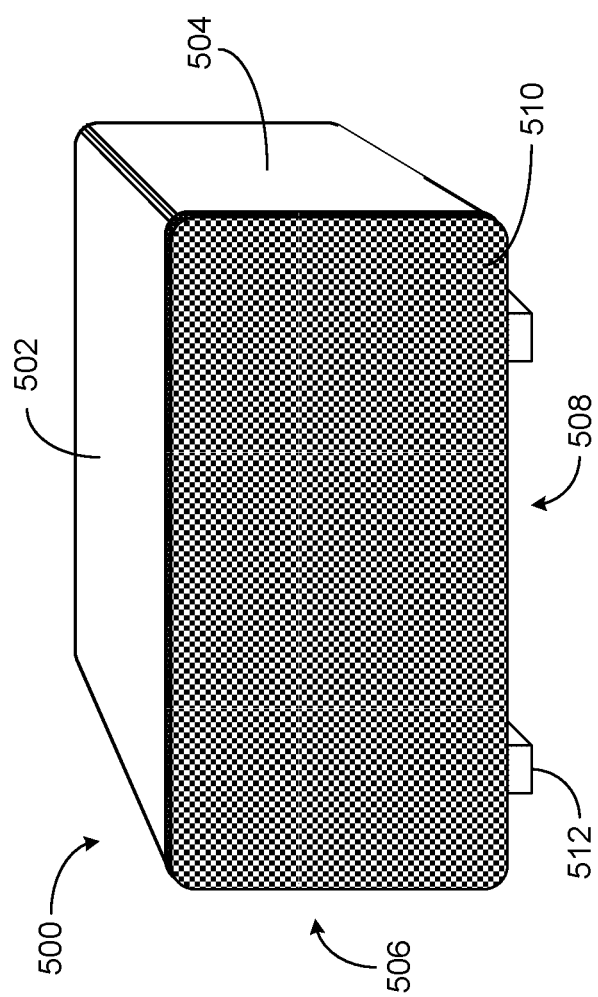
FIG. 5 shows an example of an external view of a playback device.

III. Example System for Detecting and Controlling Physical Movement of a Playback Device During Audio Playback FIG. 5 shows an external view of an example playback device in accordance with embodiments. External surfaces of the example playback device may include a first surface 502 and a second surface 504, each of which, as shown, may be substantially perpendicular to the speaker grill 510. The external surface may also include a third surface 506 and a fourth surface 508 that, in FIG. 5 are obscured by the speaker grill 510 and a body of the playback device 500. In some cases, the external surface may further include a back surface of the playback device 500

In some embodiments, the example playback device may additionally have one or more "feet" 512. The feet 512 may be nodes or protrusions to the surface 508 of the playback device designed to be in contact with a supporting surface such as a table and which supports the playback device. The feet 512 may be made of a material such as rubber or plastic having a high coefficient of friction with respect to the supporting surface so as to generally prevent the playback device from moving, including generally resisting movement of the playback device when the playback device is playing audio sound.

In some embodiments, the playback device may further have one or more indicators, such as LEDs, display panels, or lights, indicative of the operational status of the playback device. A playback device such as the playback device 500 may include the indicators on one or more surfaces of the playback device 500 that provide feedback on the status of the playback device 500. For example, the indicators may include several different colors of LED lights, for example, such as red, blue, green, and white, which may be mixed to create a broad spectrum of colors. The playback device 500 may also be capable of fading the LED lighting between different colors smoothly and without noticeable flickering. For example, a playback device 500 may have stored in memory one or more LED behavior patterns, each corresponding to a state of the playback device 500. Some LED behaviors may be a sequence of flashes, featuring one or more colors, to indicate a given state. Other states of the playback device 500 may be indicated by a constant LED light of a given color.

Figure 6:
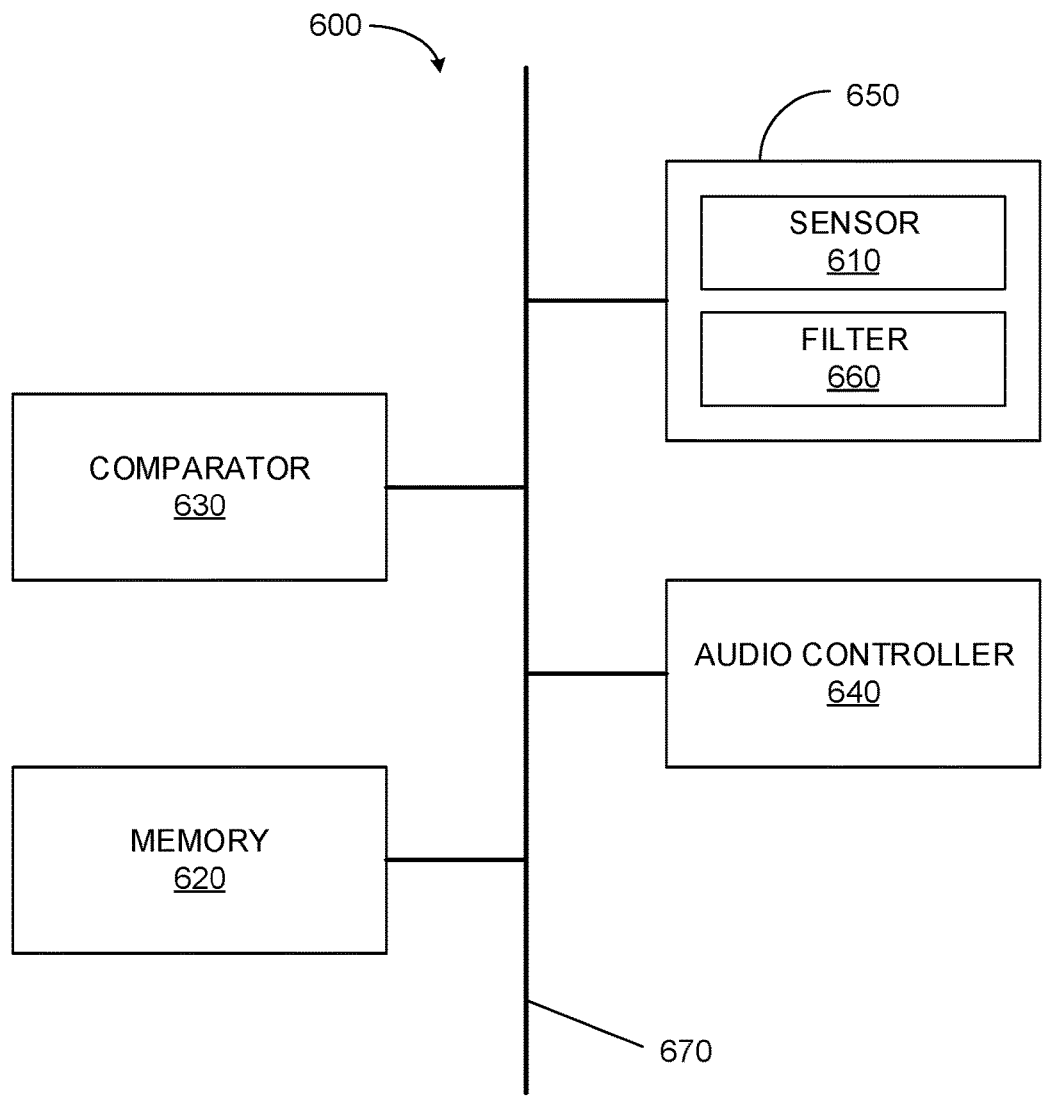
FIG. 6 shows a block diagram of an example system for detecting movement of a playback device.

FIG. 6 shows an example of a block diagram of a system 600 for reducing movement of a playback device in accordance with example embodiments. In one example, the system 600 may be integrated into a playback device 200. In the case the playback device 200 does not include the speaker(s) 212, but rather a speaker interface for connecting the playback device 200 to external speakers, the system of FIG. 6 may be integrated into the external speakers. In yet another case, one or more blocks illustrated in FIG. 600 may reside in the playback device or external speakers and other blocks may reside in other components of the media playback system 100. For example, the sensor 610 as described below may be co-located with the external speaker but the remaining components 620, 630, 640 may be located within the controller device 300, the playback device, or both. Other arrangements are also possible.

Referring back to FIG. 6, the example system 600 includes a sensor system 650 having a sensor 610. The sensor 610 detects movement of the playback device. The movement may be characterized as a translational movement in an X, Y direction which is conventionally known as a planar movement, an angular rotation movement, typically referred to as a yaw, a vertical movement in a Z direction, pitch, roll, or even a combination of one or more of these types of different movements.

Several types of sensors may be used to detect such movement. One type of such a sensor 610 is an accelerometer. The accelerometer may be used to measure acceleration and produce sensor output values in the form of an acceleration. By measuring the acceleration, the movement of the playback device can be detected. For example, if the accelerometer produces a non-zero acceleration value, then this indicates acceleration indicative of the playback device moving. Further, by integrating several measured acceleration values, velocity of the playback device can be determined, and still further by integrating the velocity, the distance of movement can be determined. Therefore, accelerometers enable determining movement of the playback device in many ways through acceleration, velocity, and distance of travel. Moreover, the accelerometer may produce acceleration values in one or more directions, such as the X, Y, or Z direction. These acceleration values can be considered together or separately to further determine or characterize the motion of the playback device.

Another type of sensor 610 which may be used to determine movement of the playback device is a gyroscope. The gyroscope allows for determining rotation of the playback device. The gyroscope produces an angular rotation rate output and therefore is indicative of rotation of the playback device. Examples of sensor output values of a gyroscope is a radian or degree output indicative of such a rotation.

Still another type of sensor that may be used to determine movement of the playback device is a magnetometer. The magnetometer is a sensor which measures direction of a magnetic field in a point in space. Essentially, the magnetometer acts as a compass. Accordingly, if the orientation of the playback device changes the magnetometer will indicate a change in orientation as a sensor output value. This change in orientation is indicative of movement of the playback device.

A playback device may use one or more different types of sensors to determine the motion of the playback device. Motion such as translating, rotating, also known as yaw, pitch, roll, or rocking may register differently depending on the sensor in use. By using different types of sensors, the playback device can determine accurately whether it is moving regardless of the type of movement.

The sensor system 650 also may include a filter 660. Because a playback device plays audio sound, this audio sound may affect the accuracy of the sensor measurement in detecting movement of the playback device. For example, vibrations induced by the audio being played by the speakers may cause the sensor to register movement of the playback device when in fact the playback device has not physically moved. Further, electrical or mechanical noise may affect the measurement of the sensor. As a result, the filter 660 can filter a sensor input into the particular sensor to reduce such false detections of motion prior to the sensor 610 generating a sensor output.

In one example, the filter may be a low pass filter or a moving average filter, such as a 32-point low pass filter. The filter may reduce audio-induced vibration effects on an accelerometer or gyroscope, or they may be used to zero out or compensate for effects of magnets of the speaker on the magnetometer. Additionally, such filters may be used to cancel the effects of electrical currents creating localized magnetic fields which may cause the magnetometer to detect falsely that there is motion of the playback device.

Alternatively, or additionally, the filter 660 may be a threshold-based filter which filters out sensor input signals which exceed an acceptable range or which are invalid. The filter 660 may filter sensor input into the sensor 610 so that the output of the sensor is a true indication of movement of the physical device and not a false detection of movement. Additionally, the filter 660 in other embodiments may filter the sensor output rather than or in addition to the sensor input into the sensor 610.

The system 600 also includes memory 630. The memory 630 may store a profile of sensor output values. This sensor profile may also be referred to as a "walking profile." The sensor profile may be, for example, sensor output values collected over a period of time which are indicative of movement of the playback device. These sensor output values may have been collected during a testing or calibration of the playback device, and/or another playback device having similar characteristics.

In one example, the playback device may play audio sounds and the playback device is visually observed for movement. When it is determined that the movement is unacceptable, the sensor output values during this condition may be collected and stored in the memory as a sensor profile indicative of sensor measurements corresponding to movement of the playback device. By unacceptable, the movement may be slight or significant depending on the desired criteria for movement. Similarly, sensor output values may be collected when the playback device is not observed to move as a sensor profile. These sensor output values collected over time during a calibration or testing stage may also be stored in the memory as an indication of the playback device being stationary. Further, the sensor profile that is captured may be based on orientation of the playback device, such that different sensor profiles may exist if the playback device is oriented horizontally or vertically, for instance.

A comparator 630 of the system 600 is communicatively coupled to the other components of the system 600 through the bus 670. The bus 670 may be a wired or wireless connection, for example, to enable the comparator 630 to access the memory 620 and sensor output values generated by the sensor 610 of the sensor system 650. The comparator 630 compares the sensor output values to the sensor profile stored in the memory 620. Further, the appropriate sensor profile compared may also be based on the orientation of the playback device, in which case the playback device is capable of determining its orientation as well, for example, using the sensors 610. The sensor output values may be captured over a period of time. In one example, the sensor output values captured over the period of time are compared to the sensor profile. If the comparator 630 determines that certain sensor output values captured over the period of time meet or exceed certain sensor output values defined by the sensor profile, then the comparator 630 declares that the playback device is moving. Similarly, if comparator 630 determines that certain sensor output values captured over a period of time is less than certain sensor output values in the sensor profile indicative of movement of the playback device, then the comparator 630 declares that the playback device is not moving.

As noted above, the memory may also store sensor profiles indicating that the playback device is stationary. The comparator 630 may further compare the sensor output values captured over the period of time to the sensor profile indicating that the playback device is stationary. By comparing both types of sensor profiles, a level of confidence can be obtained as to the state of motion of the playback device.

Other possibilities are also possible for the comparator 630 to use the sensor outputs and the sensor profile to determine whether the playback device is moving. For example, the sensor profile may be an average of one or more sensor output values and this value may be compared to an average of one or more sensor output values output by the sensor 610. If the average of the sensor output values exceeds the average of the sensor profile, then the playback device may be determined to be "moving". Further, the comparator may compare both averaged sensor output values and actual sensor output values in determining whether the playback device is moving.

The system also has an audio controller 640. The audio controller 640 allows for adjustment of the audio being played back by the playback device. When the comparator 630 indicates that the playback device is moving, then the audio controller 640 can adjust the audio sound played by the playback device in the effort to reduce or eliminate this movement. For example, the audio controller 640 may reduce the volume of the playback device to a lower amount. The amount of adjustment may be based on an absolute number, a percentage or amount related to the current volume level, a fixed number, a dynamically changing number, or some other parameter. The adjustment may also be based on the orientation of the playback device, e.g., horizontal or vertical for instance.

Additionally or alternatively, the adjustment of the audio sound being played back by the playback device may be shaped or equalized differently to reduce the movement. For example, the sound coming from the speakers may be configured to reproduce a different frequency range, e.g., a suppression of low frequency components in the audio sound such as in the range of 20 to 80 Hz. By changing the frequency configuration, the speaker's diaphragm excursions may be lessened and the playback device may move less.

Still additionally or alternatively, since playback devices can be networked as in the media playback system 100, a corresponding adjustment (e.g., volume and/or equalization) to the audio sound being played by one playback device could result in a corresponding adjustment (e.g., volume and/or equalization) to the audio sound being played back by one or more other playback devices. In this way, impact to the user's experience is lessened.

As an example, a first playback device and a second playback device may be in the same room. In this embodiment, the low frequencies played by the first playback device may be lessened to reduce movement of the first playback device and this reduction is compensated for by modifying the audio sound produced by the second playback device. Specifically, in this example, the first playback device may render audio sound in the frequency sub-range of 80 Hz to 20,000 Hz rather than 20 Hz to 20,000 Hz, and the second playback device may render audio sound substantially in the frequency sub-range of 20 Hz-80 Hz. In this example, 80 Hz may be referred to as the crossover frequency. In other words, the first playback device may filter out frequencies above 80 Hz so as to reduce its movement and render the remaining audio content, while the second playback device may filter out frequencies below 80 Hz and render the remaining audio content. These configurations may be stored as state variables on the respective playback devices.

In certain embodiments, the control device 300 may be involved in the adjustment of the audio sound played by the playback device that is moving. In one example, the playback device that is moving may also signal the control device 300 that its audio sound is being adjusted and/or that of another playback device is being adjusted. The signal may take the form of an instruction or command, for instance. This way the control device 300 can maintain a state or configuration of the audio sound being played back by the playback devices. In a second example, when a playback device is determined to be moving, the playback device may signal the control device 300 of this condition, and in turn, the control device 300 may signal the playback device to adjust its audio sound. In this example, the playback device might not responsively adjust its audio sound solely based the determination that the playback device is moving but rather based on a signal from the control device 300. In a third example, the playback device that is moving could signal another playback device in the media system 100 to adjust its audio sound. But instead of the other playback device responsively adjusting its audio sound, the other playback device could signal the controller to indicate that it is being requested to adjust its audio sound. Then, the controller may signal the other playback device to adjust its audio sound.

Other variations are also possible for the control device 300 being involved in the adjustment of the audio. In effect, the control device 300 may centralize the adjustment of the audio sound in the media system 100. Such centralization may be important, especially if one playback device is signaling another playback device to adjust the sound played, and the other playback device cannot adjust its sound because it is moving as well or for other reasons.

Figure 7:
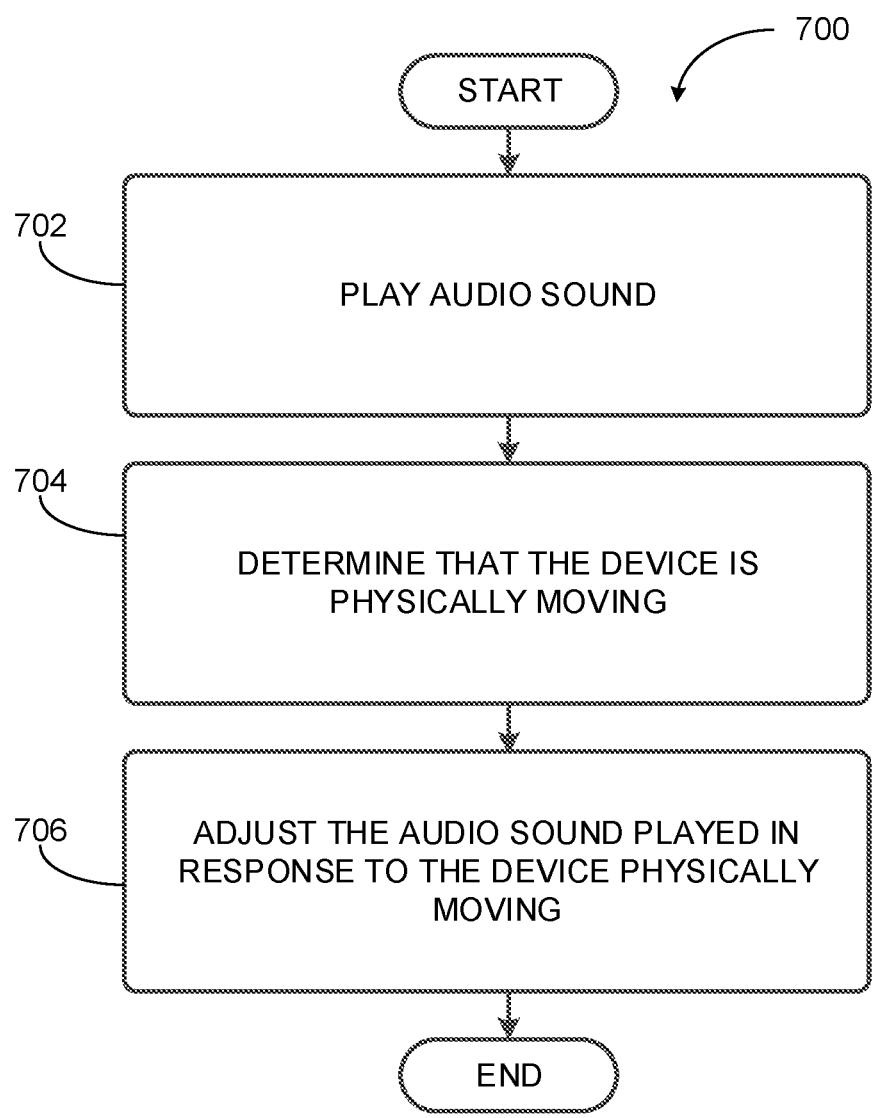
FIG. 7 is a flowchart representative of an example method for detecting movement of a playback device.

Method 700 shown in FIG. 7 presents an embodiment of a method that can be implemented within an operating environment involving, for example, the media playback system 100 of FIG. 1, one or more of the playback device 200 of FIG. 2, and one or more of the control device 300 of FIG. 3. Method 700 and the other processes disclosed herein may include one or more operations, functions, or actions as illustrated by one or more of the blocks, such as 710-730 in FIG. 7. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Referring to FIG. 7, method 700 illustrates detecting and adjusting the audio sound played by a device to reduce movement of the device. The device may be a playback device, a speaker, or other device capable of playing audio sound. At 710, a device is configured to play audio sound via a speaker enclosed in the device. At 720, while the speaker is playing the audio sound, a determination is made whether the device is physically moving. At 730, the audio sound played by the speaker of the device is adjusted in response to the device physically moving to thereby reduce the physical movement of the device.

Figure 8:
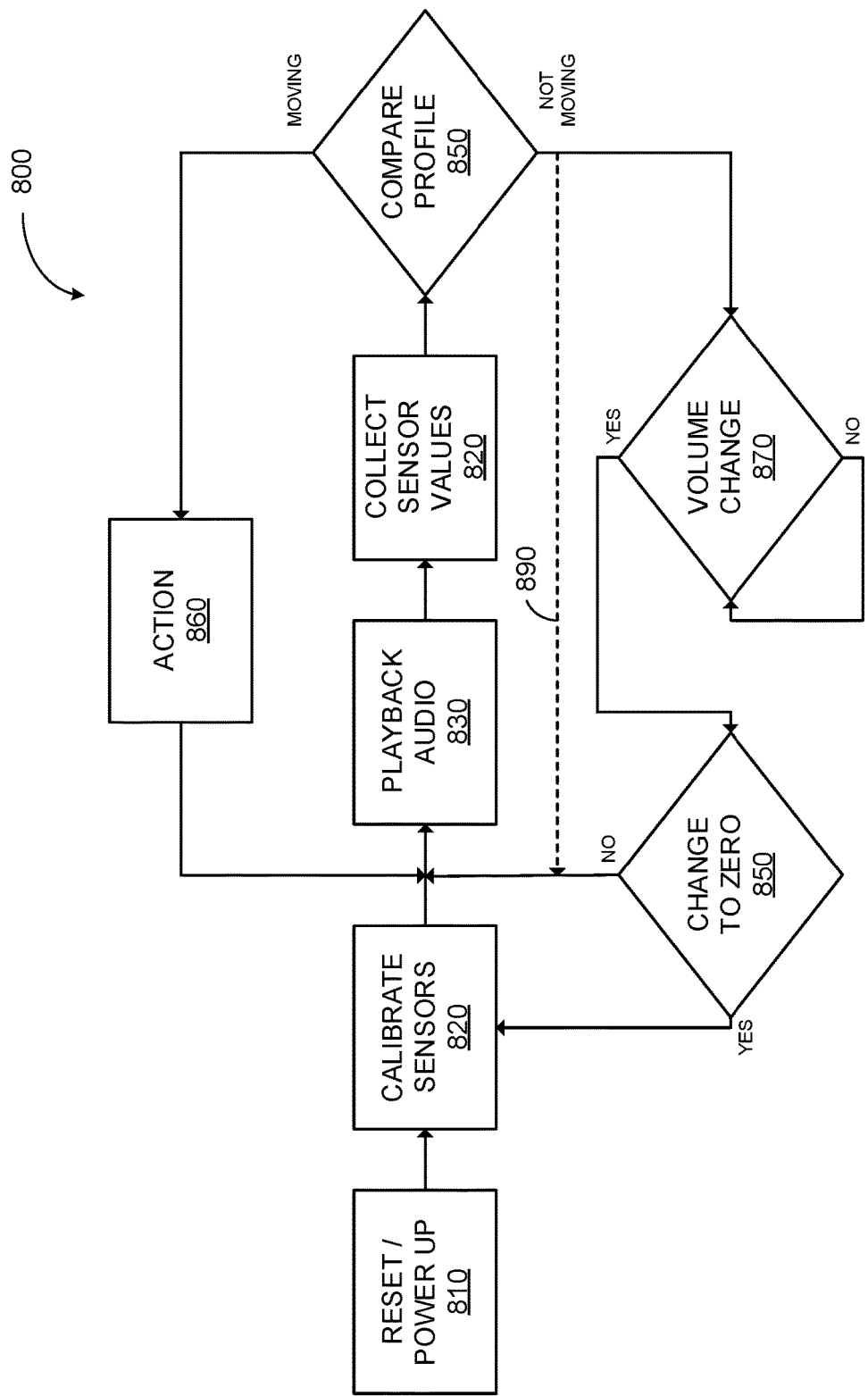
FIG. 8 is another flowchart representative of an example method for detecting movement of a playback device.

FIG. 8 is a more detailed flowchart of the method 800 for detecting movement of the playback device. At 810, the playback device is powered up or alternatively reset so that the state variables in the playback device are initialized. During this power up or reset state the playback device is not playing back any audio sound. At 820, the one or more sensors 610 of the playback device may be calibrated. The calibration process may involve setting a baseline for sensor output values when the playback device is not moving and not playing audio sound such that any sensor output values beyond the calibrated values may indicate movement of the playback device. For example, magnetic materials are typically used in the production of the speakers or transducers in playback devices. Accordingly, a magnetometer will require calibration or compensation when the playback device is not playing audio sounds. The calibration may be necessary to compensate for the localized magnetic field effects produced by the speaker transducer magnetics and for any localized magnetics fields produced by the environment in which the playback device is placed (such as microwave ovens or large metal masses such as washing machines).

At 830, the playback device is configured to play back audio. For example, a volume setting of the playback device may be increased to a non-zero amount. At 840, the sensor 610 may generate sensor output values for a period of time. The filter 660 may be used to filter out electrical, mechanical or vibrational noise, for example, when generating the sensor output values. At 850, the comparator 630 may compare the sensor output values to the sensor profile stored in the memory 620 to determine whether the playback device is moving. If the comparator 630 indicates that the playback device is moving, then at 860 an action may be taken to reduce this movement. The action may be to adjust the audio sound and then at 830 the audio sound is played back at a new setting and the method 800 proceeds to 840 and 850, effectively making the adjustment an iterative process.

As examples of the adjustment of the audio sound, the audio volume may be reduced and/or the equalization may be changed. The amount of reduction or change to the equalization may be an absolute number, a percentage or amount related to the current volume level, a fixed number, a dynamically changing number, or some other parameter. Further, for a networked playback device, the crossover frequencies and/or volume of the playback device and other playback devices may be adjusted. The new volume and/or equalization setting may continue indefinitely, until the playback device is powered off, the user manually adjusts the volume or equalization, or until the playback device "walks" again.

Further, the volume and/or equalization setting may revert back to the setting prior to adjustment or some other setting when the current song track concludes and a new song track begins. As an example, a song like "Gin and Juice" may cause the playback device to "walk" but the song "Twinkle Twinkle" might not. Therefore, the volume and/or equalization setting may change at the conclusion of "Gin and Juice" to another setting (such as the setting prior to adjustment) because the song which caused the playback device to "walk" has concluded. Other arrangements are also possible.

Optionally, an indication may be provided to a user of the playback device that the audio sound has been adjusted. For example, the lighting of the LED on the external surfaces of the playback device as discussed above may indicate this change or an indication may be provided on the user interface of control device 300. The indication can be an LED color change or flashing light, for instance. Additionally, or alternatively, the indication could be a message or alert displayed on the display of the playback device or sent to the control device 300 for display to the user on its user interface.

Still additionally or alternatively, the indication provided to a user of the playback device that the audio sound has been adjusted could be auditory. For instance, a sound pattern, such as a "beep", could be generated by the speaker which is distinct from the audio being played. The distinctness could be based on an analysis of the frequencies of the audio sound currently being played and the playback device generating a frequency sound that is distinct from those frequencies. The audible sound can indicate to the user that the audio sound has been adjusted. By one or more of these mechanisms, the user will be aware that the playback device has adjusted the audio sound, e.g., volume or equalization.

Then, the playback device may allow the user to override this setting depending on a way the playback device is configured.

If at 850, the comparator determines that the playback device is not moving, then at 870, the method 800 waits for a volume change. If there is a volume change, then at 880 a determination is made whether the volume change is to zero, which typically indicates that the playback device no longer is outputting audio sound. If so, then the sensor 610 may be recalibrated. One reason recalibration may be needed is, for example, to cancel out any drift between the time that the sensor was calibrated initially and the present time. Then, the method 800 awaits user playback of the audio at 830. However, if at 880, the method determines that the volume has changed but not to a zero level, e.g., the playback device is still playing audio sound, then method 800 returns to 830 which results in determining whether at the new volume setting the playback device is moving.

Other arrangements are also possible for detecting movement of the playback device in accordance with the embodiments. For instance, when the playback device is determined not to be moving at 850, the method 800 may proceed to 830 via optional dotted line 890 in some instances bypassing 870 and 880. In this embodiment, additional computing resources may be needed to monitor the sensor output values more often regardless of volume change with the benefit that any movement of the playback device may be more reliability detected.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A device comprising:
   a speaker configured to play audio sound, the speaker being enclosed in the device;
   a sensor;
   a processor;
   a non-transitory computer readable medium, and
   program instructions stored on the non-transitory computer readable medium that, when executed by the processor, cause the device to perform functions comprising:
   playing, by the device, the audio sound via the speaker;
   while the speaker is playing the audio sound, comparing a sensor output to a sensor profile indicative of movement of the device; and
   in response to comparing the sensor output to the sensor profile, adjusting, by the device, the audio sound played by the speaker.

2. The device of claim 1, wherein the program instructions for adjusting, by the device, the audio sound played by the speaker comprise adjusting the audio sound played by the speaker if a sensor output value meets or exceeds a value of the sensor profile.

3. The device of claim 1, wherein the program instructions for adjusting, by the device, the audio sound played by the speaker comprise adjusting a volume of the audio sound.

4. The device of claim 1, wherein the program instructions for adjusting, by the device, the audio sound played by the speaker comprise adjusting a frequency component of the audio sound.

5. The device of claim 4, wherein adjusting the frequency component includes suppressing a frequency component.

6. The device of claim 4, wherein adjusting the frequency component includes suppressing a frequency component in the audio sound that is between 20 Hz and 80 Hz.

7. The device of claim 1, wherein the sensor profile is based on the orientation of the device when the device is stationary.

8. The device of claim 1, wherein the physical movement of the device comprises a translational, rotational, yaw, pitch, roll, or rocking movement.

9. A tangible non-transitory computer readable storage medium including a set of instructions that when executed by a processor cause a device to perform functions comprising:
   playing, by the device, the audio sound via a speaker enclosed in the device;
   while the speaker is playing the audio sound, comparing a sensor output from a sensor of the device to a sensor profile indicative of movement of the device; and
   in response to comparing the sensor output to the sensor profile, adjusting, by the device, the audio sound played by the speaker.

10. The tangible non-transitory computer readable storage medium as defined in claim 9, wherein the instructions for adjusting, by the device, the audio sound played by the speaker comprise adjusting the audio sound played by the speaker if a sensor output value meets or exceeds a value of the sensor profile.

11. The tangible non-transitory computer readable storage medium as defined in claim 9, wherein the instructions for adjusting, by the device, the audio sound played by the speaker comprise adjusting a volume of the audio sound.

12. The tangible non-transitory computer readable storage medium as defined in claim 9, wherein the instructions for adjusting, by the device, the audio sound played by the speaker comprise adjusting a frequency component of the audio sound.

13. The tangible non-transitory computer readable storage medium as defined in claim 12, wherein adjusting the frequency component includes suppressing a frequency component.

14. The tangible non-transitory computer readable storage medium as defined in claim 12, wherein adjusting the frequency component includes suppressing a frequency component in the audio sound that is between 20 Hz and 80 Hz.

15. A tangible non-transitory computer readable storage medium including a set of instructions that when executed by a processor cause a device to perform functions comprising:
    playing, by the device, audio sound via a speaker enclosed in the device;
    filtering an input into a sensor of the device;
    while the speaker is playing the audio sound, analyzing an output from the sensor and, in response to a sensor output value from the analyzed sensor output indicating that the device is physically moving, adjusting the audio sound played by the speaker.

16. The tangible non-transitory computer readable storage medium as defined in claim 15, wherein the instructions for filtering the input into the sensor of the device comprise filtering out sensor input signals that exceed a predetermined threshold.

17. The tangible non-transitory computer readable storage medium as defined in claim 15, wherein the instructions for filtering the input into the sensor of the device are configured to reduce false indications of movement from the output of the sensor.

18. The tangible non-transitory computer readable storage medium as defined in claim 15, wherein the instructions for filtering the input into the sensor of the device comprise reducing audio induced vibration effects on the sensor.

19. The tangible non-transitory computer readable storage medium as defined in claim 15, wherein the instructions for filtering the input into the sensor of the device comprise canceling effects of electrical currents creating localized magnetic fields.

20. The tangible non-transitory computer readable storage medium as defined in claim 15, further comprising instructions for filtering the output from the sensor.

* * * * *

UNITED STATES PATENT AND TRADEMARK OFFICE
CERTIFICATE OF CORRECTION

| | | |
|---|---|---|
| PATENT NO. | : 10,275,213 B2 | Page 1 of 1 |
| APPLICATION NO. | : 16/015602 | |
| DATED | : April 30, 2019 | |
| INVENTOR(S) | : Seamus Daly | |

It is certified that error appears in the above-identified patent and that said Letters Patent is hereby corrected as shown below:

In the Claims

Column 20, Claim 1, Line 15, after "medium" delete "," and insert -- ; --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*